United States Patent
Lo et al.

(10) Patent No.: US 12,056,701 B2
(45) Date of Patent: *Aug. 6, 2024

(54) SYSTEM AND METHOD TO PROTECT PRIVACY OF PERSONAL-IDENTIFICATION-NUMBER ENTRY ON CONSUMER MOBILE DEVICE AND COMPUTING APPARATUS

(71) Applicant: Stripe, Inc., South San Francisco, CA (US)

(72) Inventors: Chi Wah Lo, Tsuen Wan (HK); Hwai Sian Tsai, Tsuen Wan (HK); Namson Kwok, Tsuen Wan (HK)

(73) Assignee: Stripe, Inc., South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,541

(22) Filed: Jul. 7, 2023

(65) Prior Publication Data

US 2023/0351385 A1 Nov. 2, 2023

Related U.S. Application Data

(63) Continuation of application No. 17/687,788, filed on Mar. 7, 2022, now Pat. No. 11,756,033, which is a (Continued)

(51) Int. Cl.
*G06Q 20/40* (2012.01)
*G06Q 20/20* (2012.01)
(Continued)

(52) U.S. Cl.
CPC ....... *G06Q 20/4012* (2013.01); *G06Q 20/206* (2013.01); *G06Q 20/3223* (2013.01);
(Continued)

(58) Field of Classification Search
CPC ............. G06Q 20/4012; G06Q 20/206; G06Q 20/3223; G06Q 20/3226; H04W 12/1069;
(Continued)

(56) References Cited

U.S. PATENT DOCUMENTS 9,298,901 B1 3/2016 Boss et al.
2013/0221083 A1 8/2013 Doss et al.
(Continued)

FOREIGN PATENT DOCUMENTS

CN 101388095 A 3/2009
CN 202075725 U 12/2011
(Continued)

OTHER PUBLICATIONS

CN: Office Action of 201780083187.8 (related application); Nov. 18, 2021; 11 pages.
(Continued)

*Primary Examiner* — Edwyn Labaze
(74) *Attorney, Agent, or Firm* — Womble Bond Dickinson (US) LLP

(57) ABSTRACT

A system for accepting the input of a PIN comprises a first device receiving a randomized PIN layout derived on a fourth device. The randomized PIN layout is displayed on a display of the first device. A second device comprises an input for accepting a series of key presses to produce a PIN token. The PIN token indicating each of the series of key presses. A third device is in communication with the second device. The third device derives the randomized PIN layout and receives the PIN token from the second device without the PIN token being present on the first device. The third device combines the PIN layout and the PIN token to produce a PIN. The PIN is used to authenticate a transaction. The fourth and third devices each store a shared secret used to independently derive the randomized PIN layout on the fourth and third devices.

20 Claims, 9 Drawing Sheets

Related U.S. Application Data continuation of application No. 17/088,955, filed on Nov. 4, 2020, now Pat. No. 11,288,670, which is a continuation of application No. 16/724,660, filed on Dec. 23, 2019, now Pat. No. 10,832,243, which is a continuation of application No. 15/404,297, filed on Jan. 12, 2017, now Pat. No. 10,521,793.

(51) Int. Cl.
*G06Q 20/32* (2012.01)
*G07F 7/10* (2006.01)
*H04L 9/40* (2022.01)
*H04W 12/02* (2009.01)
*H04W 12/069* (2021.01)

(52) U.S. Cl.
CPC ....... *G06Q 20/3226* (2013.01); *G07F 7/1016* (2013.01); *G07F 7/1041* (2013.01); *H04L 63/083* (2013.01); *H04L 63/0853* (2013.01); *H04W 12/02* (2013.01); *H04W 12/069* (2021.01)

(58) Field of Classification Search
CPC ...... H04W 12/02; G07F 19/00; G07F 7/1016; G07F 7/1041; G07D 11/60; H04L 63/0853; H04L 63/083

USPC ................ 705/72, 35–45; 235/379, 375, 487
See application file for complete search history.

(56) References Cited

U.S. PATENT DOCUMENTS

| | | |
|---|---|---|
| 2015/0026062 A1 | 1/2015 | Paulsen et al. |
| 2016/0092877 A1 | 3/2016 | Chew |
| 2017/0150349 A1 | 5/2017 | Huh et al. |
| 2019/0372945 A1 | 12/2019 | Reynolds |

FOREIGN PATENT DOCUMENTS

| | | |
|---|---|---|
| CN | 101695066 B | 12/2012 |
| CN | 104169954 A | 11/2014 |
| CN | 105025035 A | 11/2015 |

OTHER PUBLICATIONS

National Intellectual Property Administration, PRC; The First Office Action of CN Application No. 201780083187.8; (related application); Apr. 22, 2021; 16 pages (with translation).
National Intellectual Property Administration, PRC: Notification to Grant Patent Right for Invention of CN Application No. 2017800831878 (related application); May 27, 2022; 2 pages (including translation).

SYSTEM AND METHOD TO PROTECT PRIVACY OF PERSONAL-IDENTIFICATION-NUMBER ENTRY ON CONSUMER MOBILE DEVICE AND COMPUTING APPARATUS

CROSS-REFERENCE TO RELATED APPLICATIONS

This application is a continuation of U.S. patent application Ser. No. 17/687,788, filed Mar. 7, 2022, entitled SYSTEM AND METHOD TO PROTECT PRIVACY OF PERSONAL-IDENTIFICATION-NUMBER ENTRY ON CONSUMER MOBILE DEVICE AND COMPUTING APPARATUS, which is a continuation of U.S. patent application Ser. No. 17/088,955, filed Nov. 4, 2020, entitled SYSTEM AND METHOD TO PROTECT PRIVACY OF PERSONAL-IDENTIFICATION-NUMBER ENTRY ON CONSUMER MOBILE DEVICE AND COMPUTING APPARATUS, which is a continuation of U.S. patent application Ser. No. 16/724,660, filed Dec. 23, 2019, entitled SYSTEM AND METHOD TO PROTECT PRIVACY OF PERSONAL-IDENTIFICATION-NUMBER ENTRY ON CONSUMER MOBILE DEVICE AND COMPUTING APPARATUS, issued as U.S. Pat. No. 10,832,243 on Nov. 10, 2020, which is a continuation of U.S. patent application Ser. No. 15/404,297, filed Jan. 12, 2017, entitled SYSTEM AND METHOD TO PROTECT PRIVACY OF PERSONAL-IDENTIFICATION-NUMBER ENTRY ON CONSUMER MOBILE DEVICE AND COMPUTING APPARATUS, issued as U.S. Pat. No. 10,521,793, on Dec. 31, 2019, the contents of which are incorporated by reference herein in their entirety.

TECHNICAL FIELD

The present invention relates to a system and a method for secure PIN entry on devices with insufficient security level such as mobile computing devices.

BACKGROUND

Electronic payments, transfers, and banking can be made by a variety of means. Commonly, transactions require the use of a payment card or a bank card, or a virtual card on mobile device. The user, card holder, or account holder typically interfaces the payment card with a payment terminal or ATM machine. The most common form of security is a PIN (Personal Identification Number). A PIN is a short, numerical or alpha-numerical string and is input by a user as a security measure to verify their identity. The input is usually entered on a mechanical or touchscreen keypad or keyboard on the payment terminal. Payments card may interface with the card reader interfaces of the payment terminal using magnetic strips, direct electrical contacts, and through the use of short range wireless protocols such as RFID and NFC.

A typical payment terminal comprises of an interface for PIN entry, one or more card reader interfaces for interfacing with cards, a communication interface for communicating with the financial institution that processes the transaction, and payment applications to handle the transaction flow and handle the human interaction with the transaction flow, and user interfaces such as a screen, keypad, or touch panel for providing the means for user interaction. The high cost of payment terminal prevents small merchants to accept card payments.

More recently, smart phones and tablets have become very common, and most of the functionality in a traditional payment terminal can be realized on a smart device. The payment applications can be run on smart devices, and the smart devices provides various communication methods to connect with transaction processing entities. In such cases, the function of a payment terminal can be reduced to two essential functions: accepting PINs and interfacing with cards. In most applications, the PIN is accepted on the payment terminal instead of the mobile device, as it is difficult to ensure the privacy of a PIN on a mobile device which was not designed for that purpose.

By utilizing mobile devices the cost of payment terminals is reduced, in particular for card transactions which do not require a PIN, a simple card reader can be used with smart devices to process card transactions. However, for transactions required PINs, the cost of PIN-accepting payment terminals is still too high for smaller merchants.

In order to increase the security of PIN entry using common consumer mobile devices a number of improvements have been proposed. Many of these improvements are related to protecting the PIN and the encryption keys. One proposed improvement has been to use a random keypad that changes each time a PIN is input. A further improvement is to have two devices, a first device to display the PIN layout and a second device to enter the PIN on. The PIN layout may be fixed, it does not change, or random, it changes each time a user is required to enter a PIN. The second device for entering data may display only boxes or may display a blank screen. The user observes the first device to determine the layout of the keys and inputs the PIN on the second device by pressing or touching keys. the user input on the second device is transmit to the first device and the first device obtain the PIN. The first device can then encrypt the PIN and send to the payment network. One drawback of these methods is that the PIN layout and PIN keystrokes, also referred to as a PIN token, are present on the same device and present a single point of attack.

There exists a need for a PIN security solution where the PIN layout, PIN token do not exist together on the same device. Furthermore, it is advantageous that any encryption keys also do not exist on the same device as the PIN layout or PIN token.

SUMMARY

A first major embodiment of the invention is a system for accepting the input of a PIN comprising a first device receiving a randomized PIN layout from a fourth device. The fourth device derives the randomized PIN layout and the first device displays the randomized PIN layout on a first display of the first device. A second device comprises an input for accepting a series of key presses to produce a PIN token indicating each of the series of key presses. A third device is in communication with the second device. The third device derives the randomized PIN layout and receives the PIN token from the second device without the PIN token being present on the first device. The third device combines the PIN layout and the PIN token to produce a PIN used to authenticate a transaction.

In some embodiments of the inventions the fourth device is in communication with the third device with the fourth device and the third device each storing a shared secret. The shared secret is used to independently derive the randomized PIN layout on the fourth device and the third device.

In other embodiments of the invention the third device is located remotely from the first and second device.

In further embodiments, the first device and the second device comprise a transaction authentication system and the transaction is used to authenticate the veracity of a point of sale terminal. In other embodiments, the transaction authentication system is used to accept payments from a customer payment device.

In some embodiments, the first device and the fourth device are the same device.

A second major embodiment of the invention is system for accepting the input of a PIN. The system comprises a first device receiving a randomized PIN layout from a fourth device. The fourth device derives the randomized PIN layout. The first device displays the randomized PIN layout on a first display of the first device. A second device comprises an input for accepting a series of key presses to produce a PIN token. The PIN token indicates each of the series of key presses. A third device is in communication with the second device and the fourth device. The third device receives the randomized PIN layout from the fourth device and receives the PIN token from the second device without the PIN token being present on the first device. The third device combines the PIN layout and the PIN token to produce a PIN that is used to authenticate a transaction.

A third major embodiment of the invention is a system for accepting the input of a PIN. The system comprises a first device receiving a randomized PIN layout from a third device that derives the randomized PIN layout. The first device displays the randomized PIN layout on a first display of the first device. A second device comprises an input for accepting a series of key presses to produce a PIN token that indicates each of the series of key presses. The third device is in communication with the second device and the fourth device. The third device receives the PIN token from the second device without the PIN token being present on the first device. The third device combines the PIN layout and the PIN token to produce a PIN that is used to authenticate a transaction.

A fourth major embodiment of the invention is a method for authenticating a purchase on a point of sale terminal. The method comprises displaying a randomized PIN layout on a first device. The first device receives the randomized PIN layout from a fourth device. The fourth device derives the randomized PIN layout. The first device displays the randomized PIN layout on a first display of the first device. A PIN token is entered on a second device. The second device comprises an input for accepting a series of key presses to produce the PIN token. The PIN token indicates each of the series of key presses. A third device receives the PIN token from the second device. The PIN token is never present on the first device. The third device derives the randomized PIN layout and combines the PIN layout and the PIN token to produce a PIN. The PIN is used to authenticate a transaction. The transaction may be used to authenticate the veracity of the point of sale terminal. The transaction may be used to authenticate a payment to complete the purchase.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
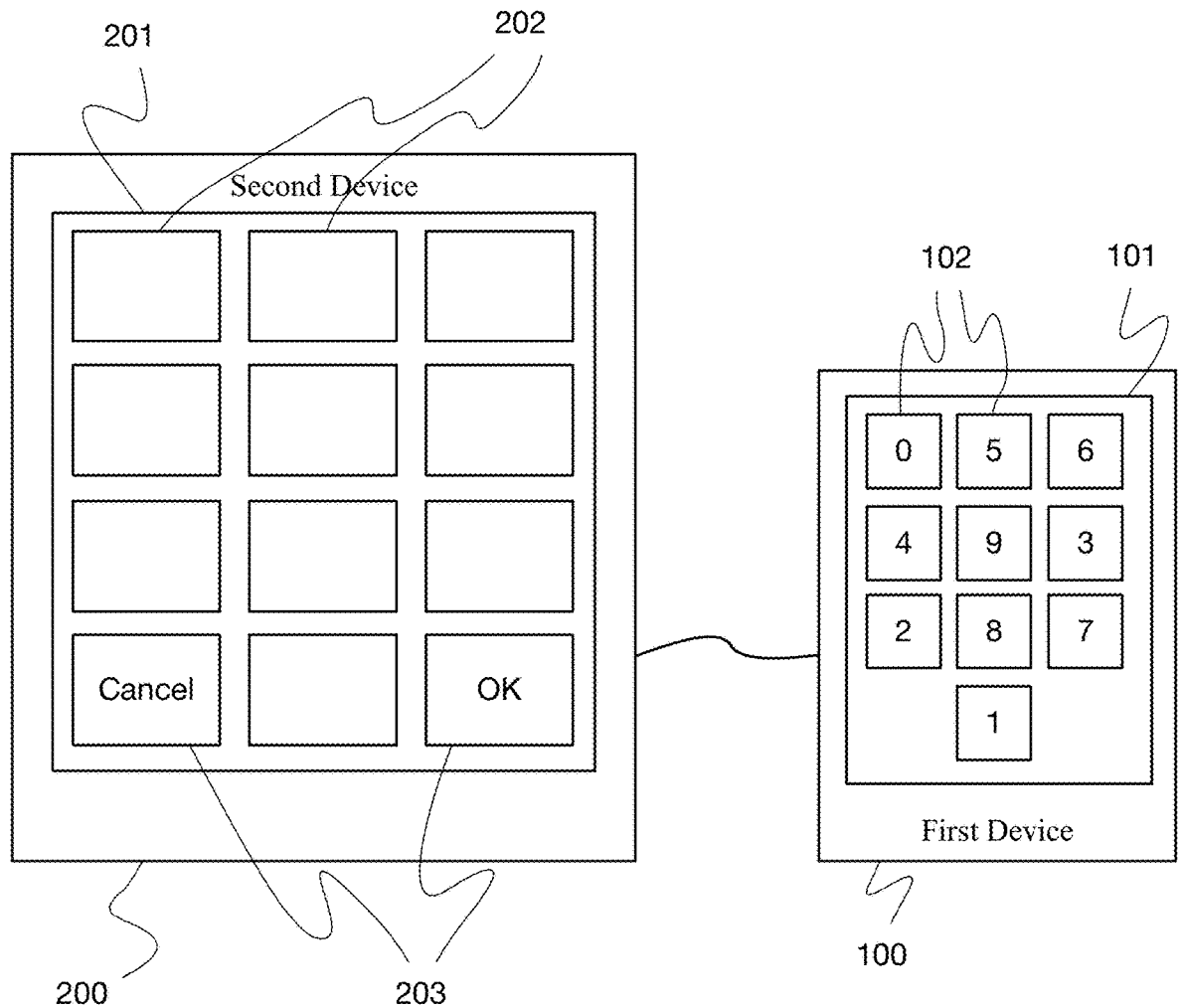
FIG. 1 shows a randomized PIN layout display on a first device and another keypad without the digits shown on a second device.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

In an exemplary embodiment of the invention comprises a system and a method to display a randomized PIN layout on a first device and accepts input, the PIN token, from the card holder or account holder on a second device in a way that the PIN layout and PIN token never exist on the same device. Embodiments of the invention may be used by a merchant authenticating their card reader device with a financial service provider or by a customer to approve a financial transaction.

FIG. 1 illustrates the use of a separate PIN layout and a PIN token. A first device 100 contains a display 101 that displays a PIN layout 102. The first device may be a dedicated device for displaying PIN layout, or a card reader which can display the PIN layout, or any devices including mobile device with suitable methods such as a special application to display the PIN layout. The first device may belong to the merchant or the account holder. The second device 200 may be a smart phone or mobile device belonging to the merchant or the account holder.

In some embodiments of the invention, the first device 100 and the second device 200 may be coupled together by a wired or wireless connection and communicate with each other over the connection in order to synchronize states between devices. For example, if the PIN keypad layout changed for every key press, then the first device and the second device must be synchronized to ensure the PIN keypad is fixed for each input. In other embodiments of the invention, the first device and second device are not required to communicate directly with each other. The first device 100 displays a PIN layout 101 on a screen as a traditional numeric entry keypad. The placement of the digits 0-9 102 may be fixed but are preferably randomly generated for each transaction or after each key press. The first device 100 may also have a number of predefined layouts with one chosen for each transaction. The first device may also generate pseudo-random layouts based on a secret value, or receive a layout from another device in the system. The second device 200 displays a grid 201 of blank keys 202, and may also display other non-numeric characters in order to control the PIN input such as an OK and Cancel button 203. In use, the user observes the PIN layout 102 of the first device in able to know which squares 202 on the second device to press to enter their PIN. The first device 100 displays the PIN layout and the second device 200 accepts the PIN token. The user may press the OK button when the PIN input is complete or press the Cancel button to abort the PIN input as is conventionally done. In embodiments of the invention, the PIN layout and the PIN token never exist on the same device. This separation adds another layer of security to the PIN input process and helps reduce the complexity of the design of both the application on the mobile second device 200 and the peripheral first device 100.

Figure 2:
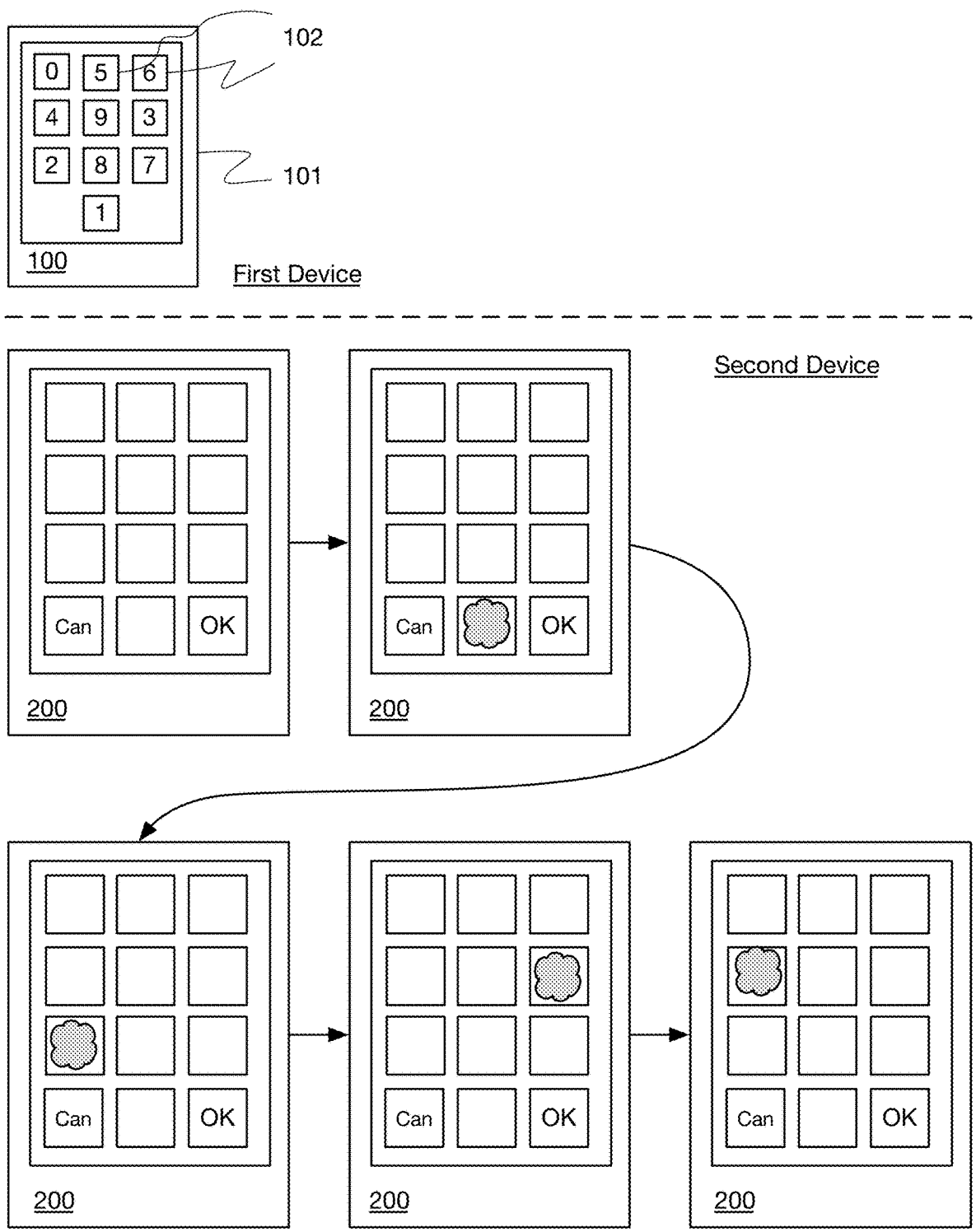
FIG. 2 illustrates the sequence of positions pressed on the second device grid to enter the PIN sequence "1243" using the randomized PIN keypad in the first device.

FIG. 2 illustrates the step by step process of entering a PIN token on the second device 200 based on the PIN layout displayed on the first device 100. In this example, the PIN 1234 is entered. In this example, the PIN layout 102 does not shuffle after each key press. However, in other examples PIN layout 102 randomizes the position of the displayed digits after every key press. It can be seen that the PIN token input on the second device 200 represents a position, key, or virtual key. For each number, character, or symbol in the PIN, it indicates which key was pressed. The PIN layout as displayed on the first device 100 represents the value of each position, key, or virtual key at that point in time. By combining the PIN layout and PIN token the PIN can be determined.

Figure 3:
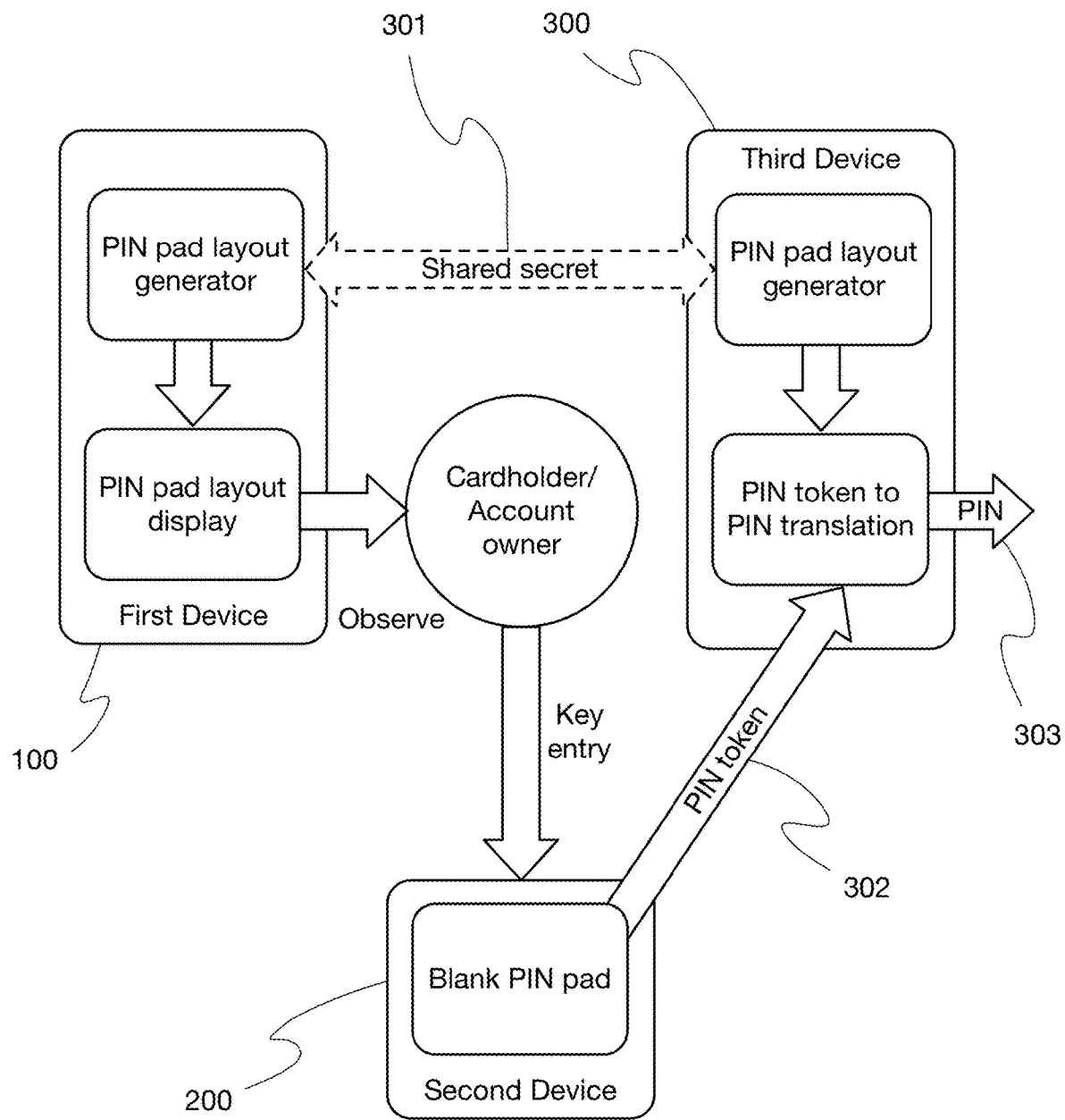
FIG. 3 illustrates the entry of a PIN in a system with a first, second, and third device where the first and third device have a shared secret.

FIG. 3 illustrated a first embodiment of the invention for securely receiving a PIN input. The system comprises a first device 100 for generating and displaying the PIN layout, a second device 200 for capturing the PIN token 302 from a user, and a third device 300 for receiving the PIN token and reconstructing the PIN 303 required to authenticate the transaction.

The first device 100 may be associated with a merchant, bank, or financial institution or the card holder, and may be card reader, cash register, self-checkout counter, or mobile device such as a smart phone, or a dedicated device for such purpose. If the first device is a smart phone device it will run a payment application that may be supplied by the smart phone manufacturer, a financial institution, a financial card company, or another third party. The first device may also have dedicated hardware or software to support encryption and decryption of sensitive data such as PIN layout mapping 101. The first device may also have a dongle or card reading interface that allows it to read secure or non-secure data from a card. The first device generates a PIN layout that may be randomized or may include a finite number of layouts that it chooses from. A new PIN layout 101 is commonly generated for each new transaction. The first device has a display on which it displays the PIN layout for the transaction. The first device may include wired or wireless communication interfaces in order to communicate with the second or a third device 300. The first device stores a shared secret 301 that is also stored by the third device. It uses this shared secret as a seed to generate the PIN layout 101. The shared secret need not be shared during transactions. It can be defined during initial setup of the devices, or be exchanged periodically. It may be manually input and may also be loaded or hard coded into devices during manufacture.

The second device 200 may also associated with a merchant, bank, or financial institution involved with a financial transaction. It is commonly a mobile or handheld electronic device such as a smartphone or tablet with an LCD display that accepts touch input, or a point of sale (POS) terminal, or computer system with a display and a hardware to accepts the PIN input. The second device runs a payment application that may be supplied by the smartphone manufacturer, a financial institution, a financial card company, or another third party. The second device may also have dedicated hardware or software to support encryption and decryption of sensitive data such as PIN Token 302. The second device may also have a dongle that allows it to read data from a card. The second device displays a keypad 201 that the user may input their PIN number on. The keypad 201 may be blank, have unmarked rectangles, contain an image, contain a false keypad, or any other display that allows the user to press buttons 202 or areas on the screen. The user refers to the PIN display 101 on the first device to determine where to press the keys, buttons, or screen 201 of the second device to input their PIN. The key presses are used to generate the PIN token 302 which indicates which keys or which areas of the screen 201 were pressed. The second device also includes wired or wireless communication interfaces in order to communicate with the third device. The second device sends the PIN Token, in either plaintext or cryptographically protected form, to the third device 300 without passing through the first device 100. As well, the randomized PIN layout 101 never exists in second device 200 and is never transferred to or through the second device, in any form, plaintext or encrypted. Therefore, the randomized PIN layout 101 and the PIN token 302 only exist in two separate devices, without being present in the other device. Compromising either one of the device does not compromise the privacy of the PIN.

The third device 300 is a secure device or a device in a secure location, for example, a backend server that is located in a secure location or off site. The third device 300 may be a dedicated device or a computer server running a payment application that may be supplied by the smartphone manufacturer, a financial institution, a financial card company, or another third party. The third device 300 stores the same shared secret 301 as the first device 100 and uses it as a seed to generate the same PIN layout 101 as the first device. In this way, the PIN layout 101 is never transmitted between devices. The third device receives the PIN token 302 from the second device 200 and combines it with the PIN layout 101, that it generates using the shared secret 301, to obtain the PIN 303. The PIN is obtained by using the PIN token to determine which key was pressed based on the position, key, or virtual key encoded in the PIN token. This is matched to the PIN layout to determine the value for the key. This is repeated for each digit or character in the PIN 303. The PIN 303 may then be encrypted. The PIN or the encrypted PIN is then used to authenticate the transaction.

In some embodiments of the invention, the first device 100 may be the cardholder's device and the second device 200 may be the merchant's smart phone, terminal, or device. In this case the PIN layout 101 is displayed on the cardholder's device 100 and the PIN token 302 is input to the merchant's device 200. In other embodiments of the invention, the first device 100 may be the merchant's device and the second device 200 may be the card holder or account holder's device. In further embodiments of the invention, both the first device 100 and the second device 200 are the card holder's devices. In other embodiments of the invention both the first device 100 and the second device 200 are owned by the merchant. These embodiments replace present day payment systems where the PIN will exist or be stored within a terminal that combines functionality of both the first and second devices.

In embodiments of the invention, the first device 100 that displays the PIN layout, and the second device 200 where the PIN is input must be in proximity to each other so that the person inputting the PIN may manipulate the second device while viewing the first device. There are no restrictions on the location of the third device 300 and a fourth device 400. Either or both of them may be located in the same location as the first and second device, in a separate room, or in a remote location.

Figure 4:
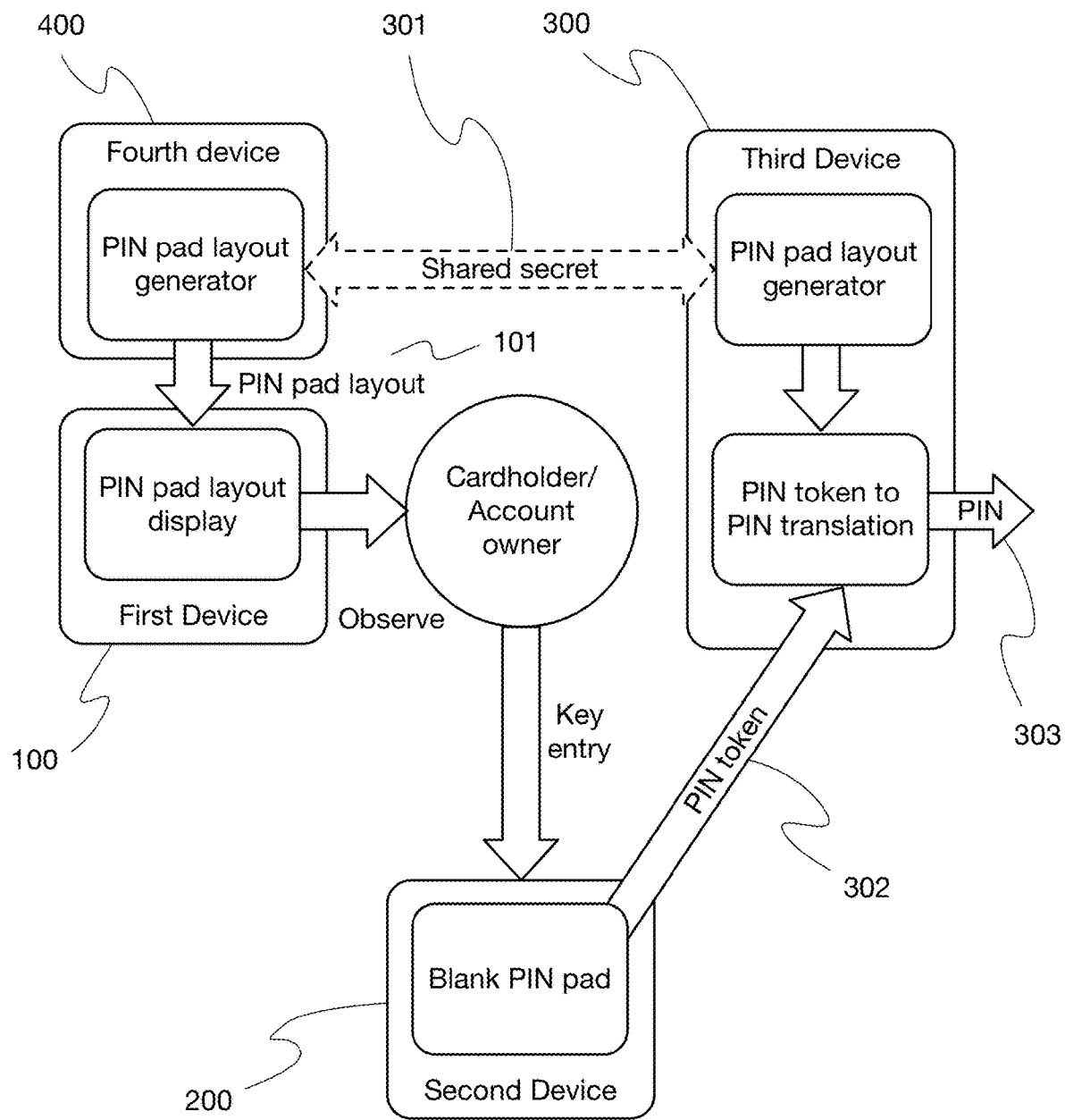
FIG. 4 illustrates the entry of a PIN in a system with a first, second, third and fourth device where the third and fourth device have a shared secret.

FIG. 4 illustrated a second embodiment of the invention for securely receiving a PIN input. In this embodiment, the first device 100 has a simplified function to display the PIN layout 101 that it received over a communications interface from a fourth device 400. The randomized PIN layout 101 is generated on by the fourth device 400 using the shared secret 301 that it has in common with the third device 300. This allows the third and fourth devices to generate or derive the same pseudo-random keypad layout 101 without transmitting the PIN layout between them. The second device is the same as the one mentioned in the first embodiment. As before, the PIN token from the second device never passes through the first device, in plaintext or encrypted form.

Figure 5:
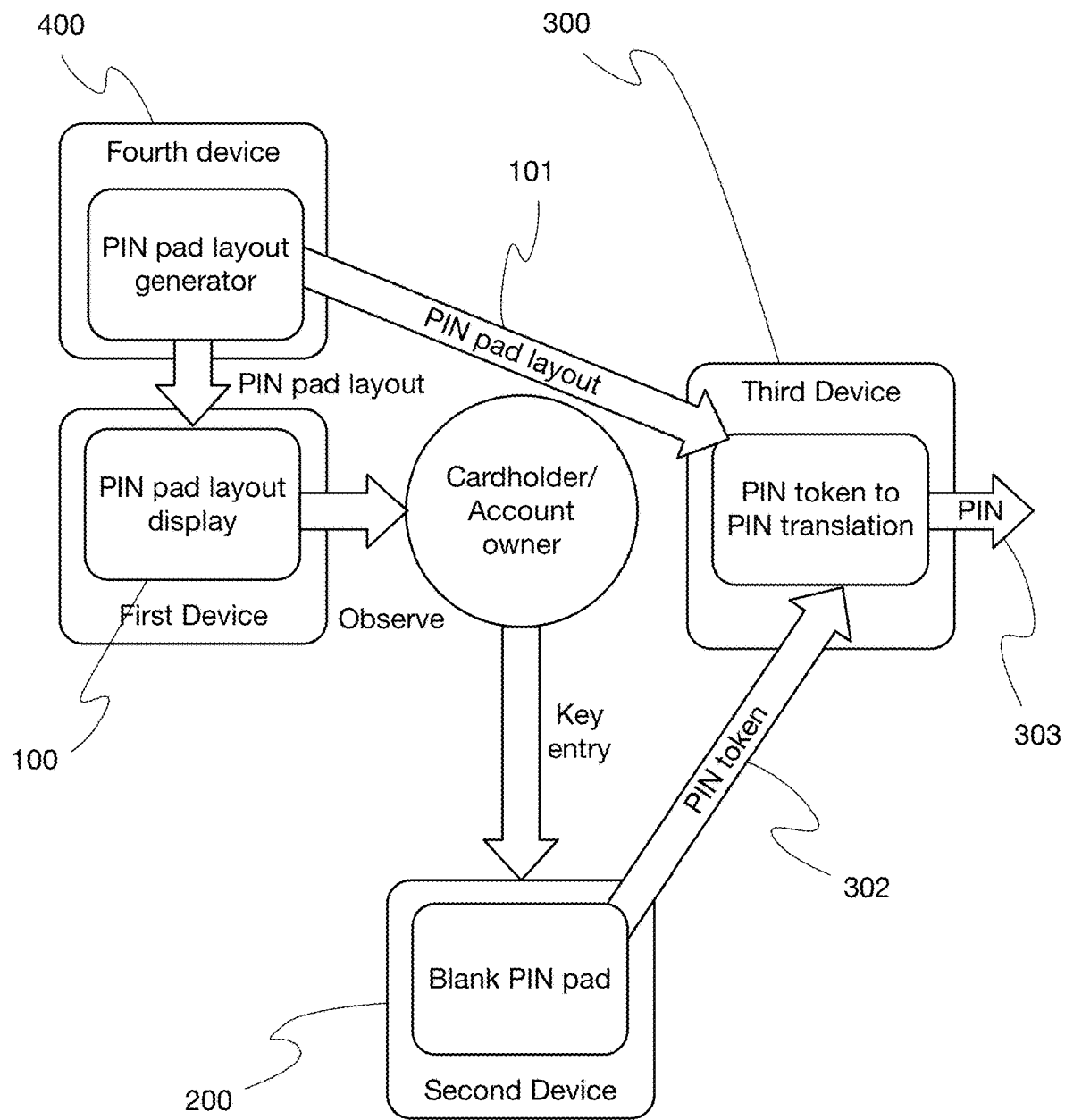
FIG. 5 illustrates the entry of a PIN in a system with a first, second, third and fourth device where the fourth device generates the PIN pad layout for the first and third devices.

FIG. 5 illustrated a third embodiment the invention for securely receiving a PIN input. This embodiment is similar to the second embodiment as shown in FIG. 4 however, there is no shared secret 301 associated with generating the PIN layout 101 shared between the third device 300 and the fourth device 400. Instead the fourth device is responsible for the generation of the randomized PIN layout 101 and generates it on its own. It then transmits the PIN layout to the third device 300 over a wired or wireless communications interface. The PIN layout may be encrypted before transmission by the fourth device. The third device receives the encrypted PIN pad layout from the fourth device and decrypts it. It also receives the PIN token 302 from the second device and uses them to construct the PIN 303.

Figure 6:
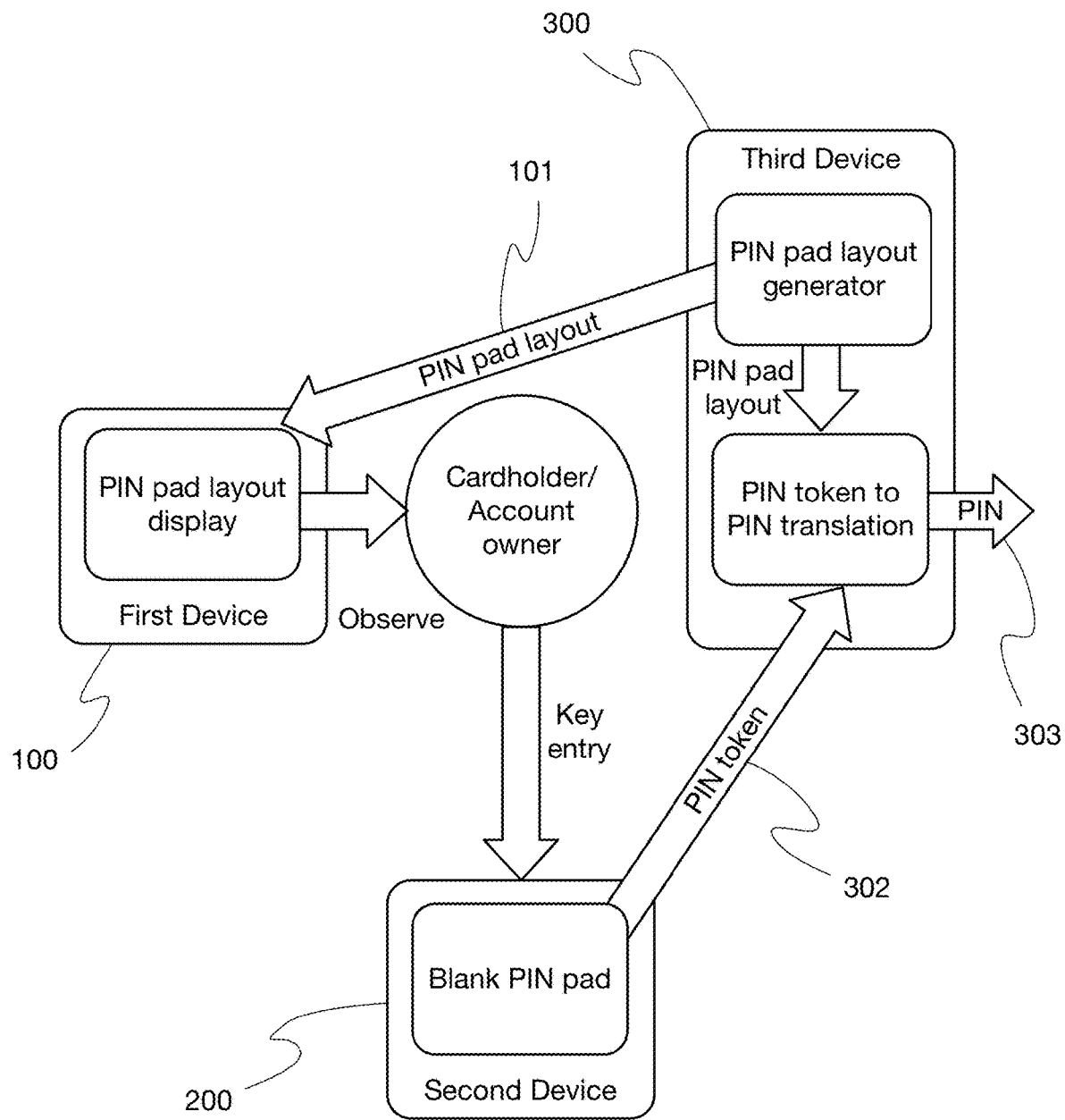
FIG. 6 illustrates the entry of a PIN in a system with a first, second, and third device where the third device generates the PIN pad layout for the first device.

FIG. 6 illustrated a fourth embodiment of the invention for securely receiving a PIN input. This embodiment is a variation on the first embodiment as shown in FIG. 3. In this embodiment, the first device 100 and third device 300 do not have a shared secret. Instead, the third device is responsible for the generation of the randomized PIN layout 101 and generates it independently. It then transmits the PIN layout to the first device 100 over a wired or wireless communications interface. The PIN layout may be encrypted before transmission by the third device 300. The first device receives the encrypted PIN pad layout 101 from the third device and decrypts it.

Figure 7:
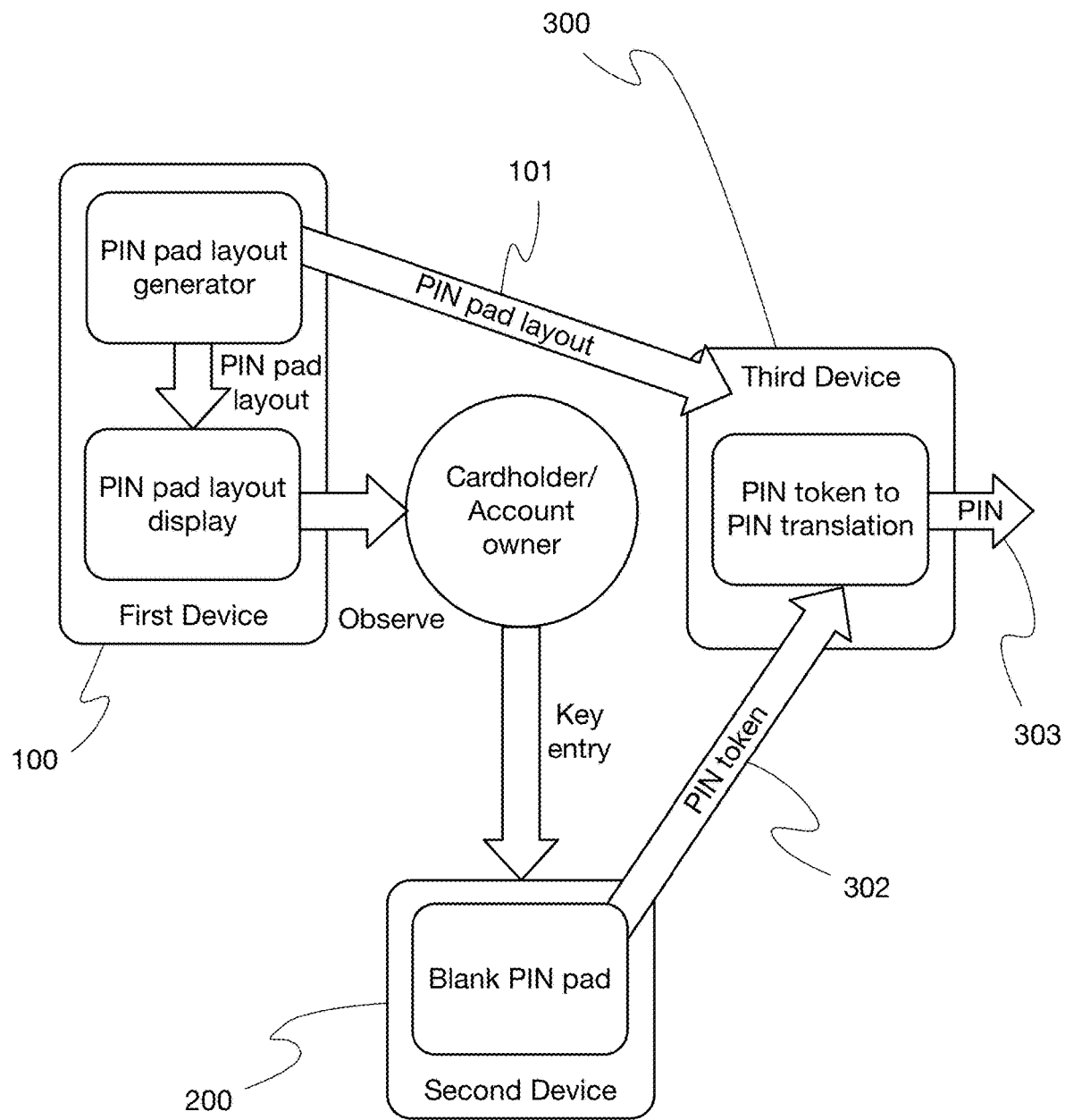
FIG. 7 illustrates the entry of a PIN in a system with a first, second, and third device where the first device generates the PIN pad layout for the third device.

FIG. 7 illustrated a fifth embodiment of the invention for securely receiving a PIN input. This embodiment is another variation on the first embodiment as shown in FIG. 3. In this embodiment, the first device 100 and third device 300 do not have a shared secret. Instead, the first device is responsible for the generation of the randomized PIN layout 101 and generates it independently. It then transmits the PIN layout to the third device 100 over a wired or wireless communications interface. The PIN layout may be encrypted before transmission by the first device 300. The third device receives the encrypted PIN pad layout 101 from the first device and decrypts it.

There are many variations possible for embodiments of the invention which are not being listed exhaustively. However, in embodiments of the invention, the PIN layout 101 is not displayed on the device on which the PIN token 302 is input. Furthermore, the PIN layout 101 and the PIN token 302 are never present together on either the first 100 or the second device 200, which are generally the devices used at the location where the transaction happens. Both the PIN layout 101 and the PIN token 302 are only present on the third device 300 which is a remote or secure server or device. In this way, compromising the device displaying the PIN layout or the PIN token alone will not allow an intruder to determine the PIN 303 for the smart card, or mobile device of the card holder or account holder.

Figure 8:
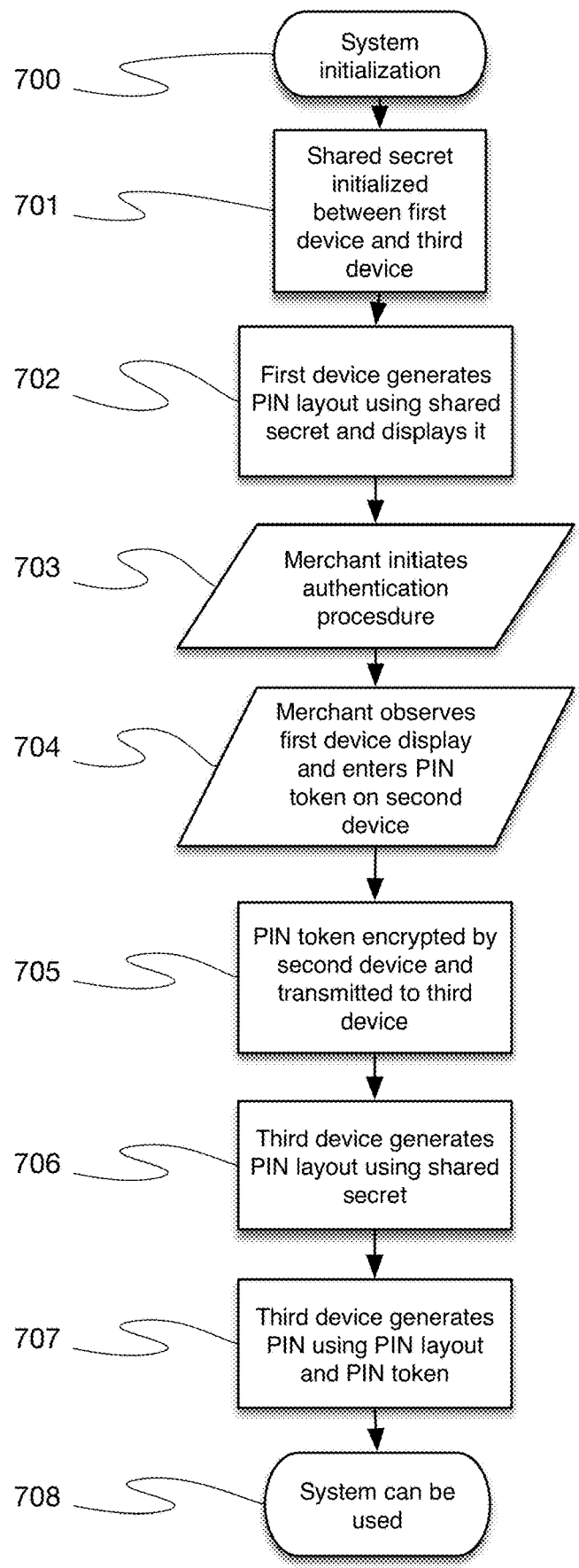
FIG. 8 illustrates the process where the system is initialized.

FIG. 8 illustrates an exemplary process of initializing a system according to an embodiment of the invention. To initialize the system 700, devices must have any proprietary software installed, user accounts set up, configuration done, and to be authenticated with a payment processor, financial institution, corporate server, or any other authoritative or security device. For embodiments that require a shared secret 702, either a secret to derive the PIN layout, or a secret for encryption and decryption of other data, this must be configured. The merchant will then authenticate 703 their card reader device with a payment processor, financial institution, or a corporate server as required to ensure that the device is not compromised and being used in a non-fraudulent manner. The merchant may use embodiments of this invention to enter a PIN on their device to generate a separate PIN layout 702 and PIN token 704 on separate devices. The PIN is generated on the third device 707 and used to enable the card reader or point of sale terminal to allow it to process financial transactions 708.

Figure 9:
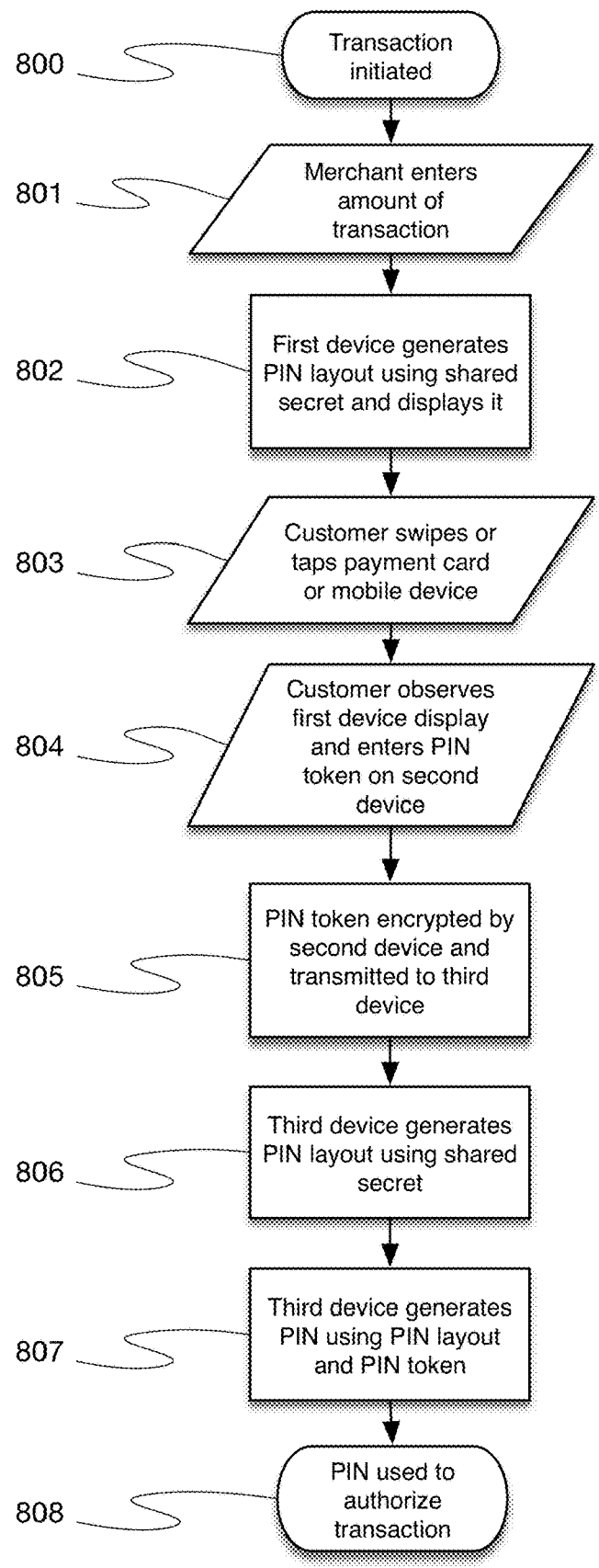
FIG. 9 illustrates the process where the system is used to process a payment transaction.

In FIG. 9 a transaction is initiated 800 when a customer chooses a set of products or services and wished to pay for it. The merchant will calculate the price of the products and enters the amount 801 in a cash register or similar device. The customer indicates that they would like to pay using electronic payment methods such as bank cards or mobile wallets. The merchant then initiates the generation of the PIN layout on the first device. The first device uses the shared secret to generate and display the PIN layout on its display 802. The PIN layout will be randomized for each transaction. The customer's physical card, virtual card or wallets will then be swiped, tapped or inserted 803, and then the PIN input process will be initiated on the second device. This will cause a blank keypad to be displayed on the second device together with control keys such as OK, Cancel, and backspace. The customer will then observe the display on the first device to know the values of the blank keys of the keypad on the second device and enter the PIN by pressing the correct blank keys on the second device 804. The second device will take the positions of the pressed keys to produce the PIN token 805. Once the PIN has been input the second device will transmit the PIN token to the third device, optionally encrypting it before transmission. The third device with is a dedicated hardware appliance or a server in a secure or off site location receives the PIN token and decrypts it if necessary. The third device also uses the shared secret to generate a local copy of the PIN layout 806. It then combines the local PIN layout with the PIN token to produce the PIN 807. The PIN token supplies the location of the presses to indicate which keys were pressed. The PIN layout is used to determine the values of the PIN. The PIN is then used to authenticate the transaction 808.

While particular implementations and applications of the present disclosure have been illustrated and described, it is to be understood that the present disclosure is not limited to the specific examples of electronic payments and point of sale terminal authentication. Many other applications involving the secure input of a PIN, or other input involving positional information, the token, and layouts involving numbers, characters, symbols, pictures or other similar indicators may benefit from the improved security embodiments of this invention provide.

What is claimed is:

1. A method for secure personal identification number (PIN) entry during a transaction, the method comprising:

displaying, by a first device, a blank keypad that enables the user to enter a series of key presses at locations of the blank keypad, corresponding to a randomized PIN layout displayed on a display of a second device, to enter a user PIN using the first device, the randomized PIN layout determined by the second device after initiation of the transaction;

in response to receipt of the series of key presses from the user on the blank keypad, generating, by the first device, a PIN token comprising data indicative of the locations of each of the series of key presses;

transmitting, by the first device, the PIN token to a third device;

receiving, by the third device, the PIN token from the first device;

generating, by the third device, a local copy of the randomized PIN layout;

producing, by the third device, values of the user PIN based on the local copy of the randomized PIN layout generated by the third device and the locations of each of the key presses in the PIN token; and authenticating the transaction using the values of the user PIN produced by the third device.

2. The method of claim 1, wherein the third device is a server computer system remotely located from the first device, and the first device and the third device are communicatively coupled via a communications network.

3. The method of claim 1, wherein transmitting, by the first device, the PIN token to the third device, and producing, by the third device, the values of the user PIN based on the local copy of the randomized PIN layout generated by the third device and the locations of each of the key presses in the PIN token, further comprises:

encrypting, by the first device prior to the transmitting, the PIN token to generate an encrypted copy of the PIN token;

transmitting, by the first device, the encrypted copy of the PIN token to the third device;

decrypting, by the third device, the encrypted copy of the PIN token to obtain an unencrypted copy of the PIN token; and producing, by the third device, the values of the user PIN based at least in part on the locations of each of the key presses in the unencrypted copy of the PIN token.

4. The method of claim 1, wherein the blank keypad is displayed by the first device in response a capture of user payment information for the transaction.

5. The method of claim 1, wherein the third device stores a shared secret known to the second device, and method further comprises:

generating, by the third device, the local copy of the randomized PIN layout based on the shared secret; and wherein the randomized PIN layout is not transmitted between the second device and the third device.

6. The method of claim 1, wherein a fourth device and the third device store a shared secret, and the displaying comprises further comprises:

transmitting, by the fourth device to the second device, the randomized PIN layout generated by the fourth device based on the shared secret;

generating, by the third device, the local copy of the randomized PIN layout based on the shared secret; and wherein the randomized PIN layout is not transmitted between the fourth device and the third device.

7. The method of claim 1, wherein the PIN token generated by the first device is not accessible to the second device.

8. The method of claim 1, further comprising:

generating, by the third device, the randomized PIN layout by generating the randomized PIN layout at the third device; and transmitting, by the third device, the randomized PIN layout to the second device.

9. The method of claim 8, wherein the third device encrypts the randomized PIN layout prior to transmission of an encrypted version of the randomized PIN layout to the second device causing the second device to decrypt the encrypted version of the randomized PIN layout received from the third device.

10. The method of claim 1, further comprising:

generating, by the third device, the local copy of the randomized PIN layout by receiving the randomized PIN layout generated by the second device.

11. The method of claim 10, wherein the third device receives an encrypted version of the randomized PIN layout from the second device, and the third device decrypts the encrypted version of the randomized PIN layout received from the second device.

12. The method of claim 1, wherein the third device generates a new local copy of the randomized PIN layout for each new transaction.

13. The method of claim 1, wherein the third device generates a new local copy of the randomized PIN layout after each keypress of the user at the first device.

14. The method of claim 1, wherein the third device generates the local copy of the randomized PIN layout based on a set of predefined PIN layouts.

15. The method of claim 1, wherein the third device generates the local copy of the randomized PIN layout using a shared secret as a seed to determine the randomized PIN layout and generate the local copy of the randomized PIN layout.

16. The method of claim 15, wherein the shared secret is defined prior to the transaction.

17. A system for enabling secure personal identification number (PIN) entry during a transaction comprising:

a first device configured to:

display a blank keypad that enables the user to enter a series of key presses at locations of the blank keypad, corresponding to a randomized PIN layout displayed on a display of a second device to enter a user PIN using the first device, the randomized PIN layout determined by the second device after initiation of the transaction, generate a PIN token comprising data indicative of the locations of each of the series of key presses in response to receipt of the series of key presses from the user on the blank keypad, and transmit the PIN token to a third device; and the third device, communicatively coupled with the first device, configure to:

receive the PIN token from the first device, generate a local copy of the randomized PIN layout, and produce, for authentication of the transaction, values of the user PIN based on the local copy of the randomized PIN layout generated by the third device and the locations of each of the key presses in the PIN token.

18. The system of claim 17, wherein the third device is a server computer system remotely located from the first device.

19. The system of claim 18, further comprising:

the first device configured to:

encrypt, prior to transmission to the third device, the PIN token to generate an encrypted copy of the PIN token, and transmit the encrypted copy of the PIN token to the third device; and the third device configured to:

decrypt the encrypted copy of the PIN token to obtain an unencrypted copy of the PIN token, and produce the values of the user PIN based at least in part on the locations of each of the key presses in the unencrypted copy of the PIN token.

20. The system of claim 17, wherein the third device generates a new local copy of the randomized PIN layout for each new transaction.

* * * * *